Oct. 3, 1967  J. W. SANDERS  3,344,737
BARBECUE PIT

Filed Oct. 18, 1965  3 Sheets-Sheet 1

INVENTOR
JAMES W. SANDERS
BY Russell & Moore
ATTORNEYS

Oct. 3, 1967  J. W. SANDERS  3,344,737
BARBECUE PIT
Filed Oct. 18, 1965  3 Sheets-Sheet 2

INVENTOR
JAMES W. SANDERS

BY *Russell + Moore*

ATTORNEYS

Oct. 3, 1967 J. W. SANDERS 3,344,737
BARBECUE PIT
Filed Oct. 18, 1965 3 Sheets-Sheet 3
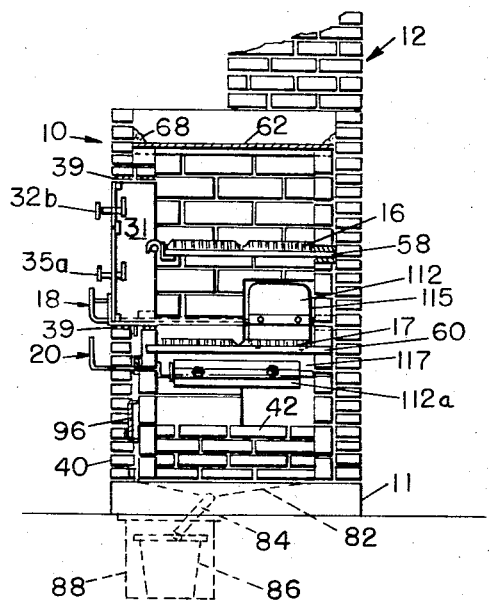
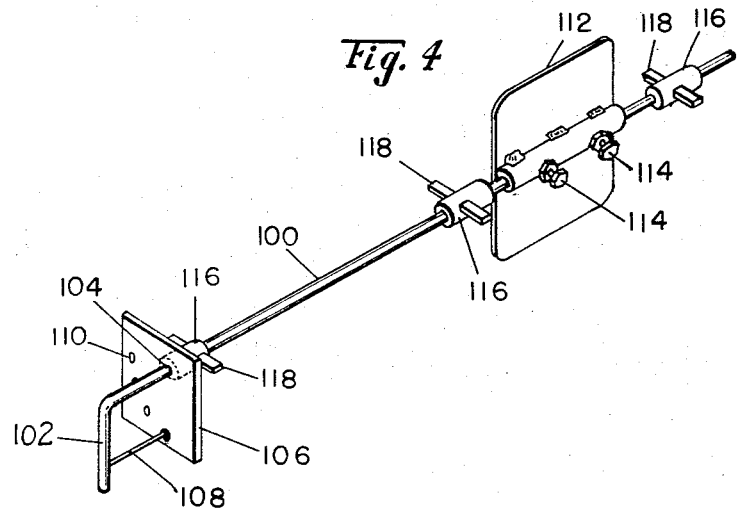
INVENTOR
JAMES W. SANDERS
BY *Russell & Moore*
ATTORNEYS

United States Patent Office 3,344,737
Patented Oct. 3, 1967

3,344,737
BARBECUE PIT
James W. Sanders, 812 Meadowbrook Drive,
Seymour, Ind. 47274
Filed Oct. 18, 1965, Ser. No. 497,353
13 Claims. (Cl. 99—446)

ABSTRACT OF THE DISCLOSURE

A barbecue pit combination having an end chimney communicating with one side of a barbecue oven which opposite side communicates with a fire box means for barbecuing meat without having a burned grease taste.

This invention relates to improvements in barbecue pits, and more particularly to unitary masonry pits which may be either prefabricated and transported to the site of use or built in situ for either indoor or outdoor use, as desired.

Many of the present masonry barbecue pits in use provide facilities for barbecuing meat with no provision of preventing the drippings of the meat from being burned in contact with the flames, smoke and hot gases from the fire box compartment resulting in the barbecue meat having a burnt like taste rather than a sweet succulent barbecue taste as results in the present invention.

The present invention overcomes the above disadvantages by having a novel damper and structural arrangement for bypassing the hot fire gases over the meat during barbecuing of the meat and novel flow paths for the heat under the meat when the meat charging door is opened during inspection, for removing the barbecued meat or recharging the barbecue pit with new meat to be barbecued, which prevents the fumes and smoke from the fire box from coming out into the room or operating area of the barbecue pit.

A primary object of the present invention is to provide a barbecue pit of unique structural design having a pleasing masonry design, multiple layers of barbecue grates, and novel cooking facilities which result in an improved taste in the meat barbecued therein.

Another object of the invention is to provide a masonry barbecue pit having a new draft means which selectively passes the hot fire gases above the meat during barbecuing and below the meat during inspection, removal of the barbecued meat or charging of the pit with new meat to be barbecued.

A further object of the invention is to provide a barbecue pit having novel collection and disposal facilities for the grease drippings from the meat during barbecuing thereof.

A still further object of the invention is to provide a barbecue pit with novel structural facilities in the form of a removable grease drip pan and a bucket pit for grease overflow and periodical removal of drainage therein.

Another object of the invention is to provide a barbecue pit which has a thermal heat register for determining the temperature of the barbecuing compartment of the pit during operation thereof.

A further object of the invention is to provide a barbecue pit having a plurality of charging and inspection doors therefor.

Another object of the invention is to provide a barbecue pit with a unique wood fired compartment with fire lining and a charging and cleanout door having a damper or draft flow means therefor.

A still further object of the invention is to provide a barbecue pit having an attractive chimney therefor with a spark arrester screen over the smoke outlet of the top of the chimney.

Another object of this invention is to provide an attractive masonry barbecue pit supported on a unitary concrete or stone base therefor.

A further object of this invention is to provide a barbecue pit having a metal top to the barbecue oven covered with insulation over which a pleasing design of masonry brick are layed, if desired, which also further improves the heat retaining qualities of the barbecue pit during firing thereof for uniform cooking or barbecuing of the meat therein.

Other objects and features of novelty will become apparent from the following specification when considered in connection with the accompanying drawing in which a preferred embodiment is illustrated by way of example, as understood by those skilled in the art.

Figure 2:
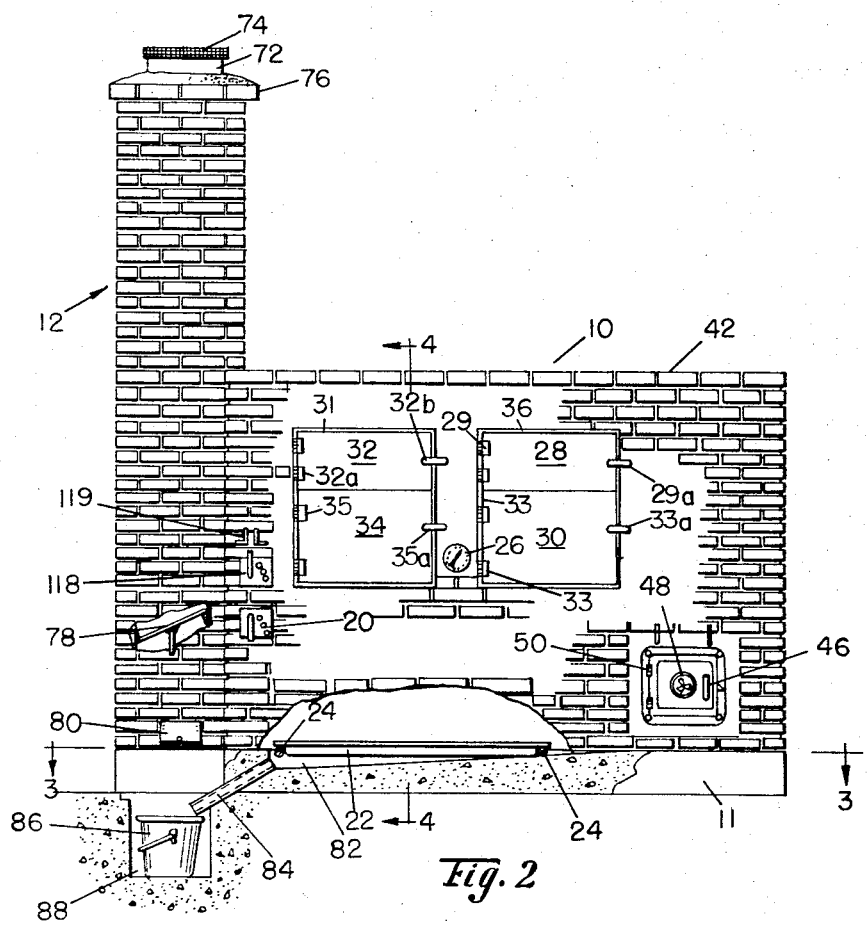
FIGURE 2 is a front elevation view with broken away sections for showing the chimney, ash trap door and the drip pan removably supported on rods having a grease overflow pipe communicating with a bucket pit which may also be used as a means for cleaning the chimney of the barbecue pit.

FIGURE 4 is a cross-sectional view in elevation of FIGURE 2 taken substantially on lines 4—4, showing the structural arrangement of doors, barbecue grates, and plurality of dampers to the chimney 12 for the various flow paths of the hot gases from the fire box over the meat supporting grates of the new barbecue pit; and FIGURE 5 is a perspective view of one of the dampers as used in the new barbecue pit.

Like reference characters represent like parts in the various figures of the drawings.

Figure 1:
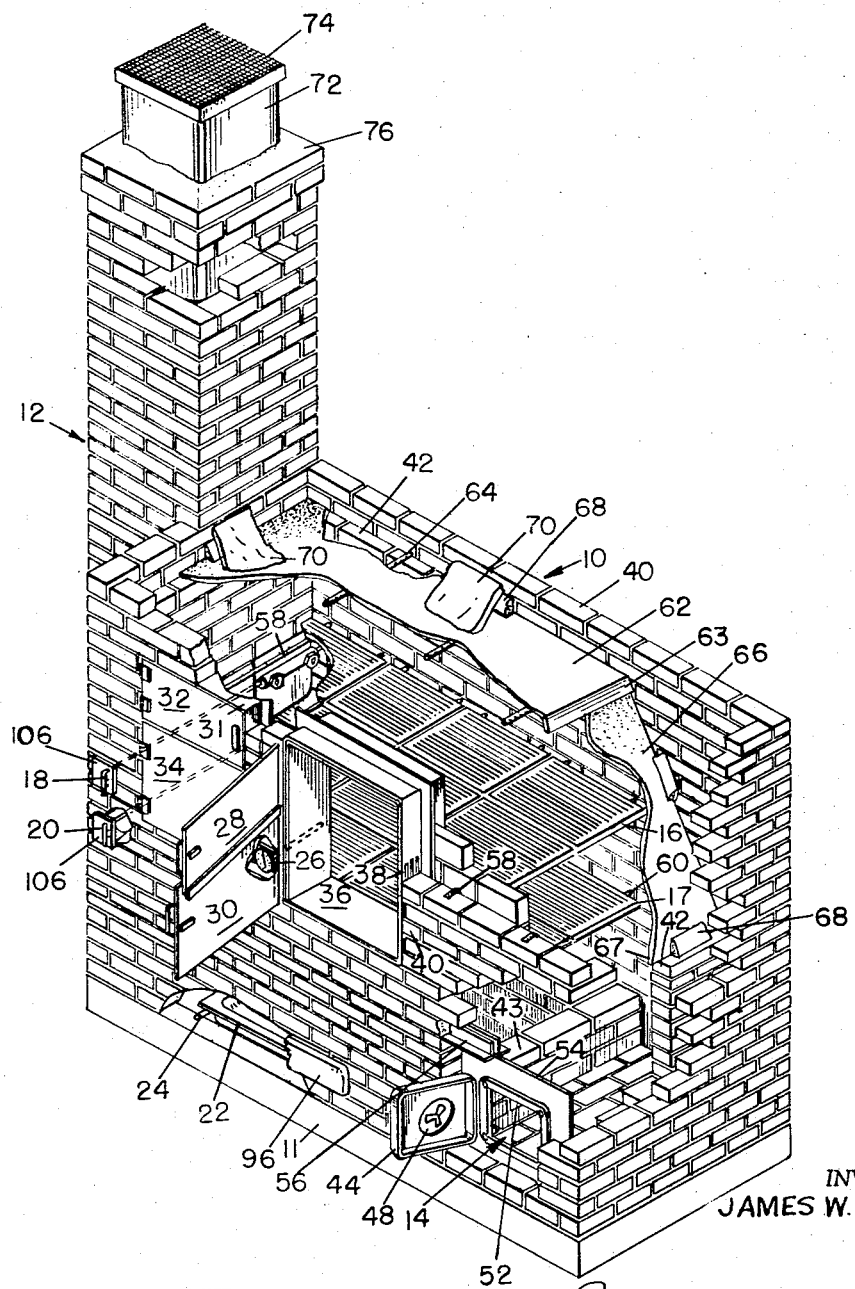
FIGURE 1 is a perspective view with broken away portions of the new masonry barbecue pit of this invention.

FIGURE 1 shows a masonry barbecue pit indicated generally by reference numeral 10 comprising, in general a base 11, smoke stack 12, a fire box 14, upper and lower cooking grates 16 and 17, dampers 18 and 20, drip pan 22 supported on rods 24, oven thermometer 26, servicing and inspection doors 28, 30, 32 and 34.

Doors 28 and 30 are hingedly attached to a supporting frame means 36 which is secured by expansion asbestos rope means 38 or the like to metal angle means 39 and face brick work 40, as shown in FIGURE 4.

Doors 32 and 34 are hingedly attached to supporting frame means 31 secured by expansion asbestos rope means 38 or the like to brick work 40.

The barbecue pit 10 and fire box 14 are suitably lined with refractory or fire brick 42.

Fire box 14 is provided with an inner fire wall 43, fuel charging door 44 having a conventional outer handle 46 and adjustable draft damper means 48 therein, as best seen in FIGURE 2. Door 44 is secured by hinges 50 to door frame means 52 having an upstanding portion 54 medially secured between angle irons 56 which are suitably secured in brick work 40, as shown in FIGURE 1. Fire box 14 may have conventional fire grates therein for using hickory wood and the like, if desired.

Barbecuing grates 16 are supported on rods 58 suitably secured in brickwork 40, as shown in FIGURE 1.

Barbecuing grates 17 are supported on rods 60 suitably secured in brickwork 40, as shown in FIGURE 1.

The cooking grate and barbecuing area is covered by an upper steel plate 62 supported on a plurality of rods 64 suitably supported by fire bricks 42. The rear portion 63 of plate 62 is bent in an angular form to cover the upper edge portion of sloping steel plate 66 which substantially covers the fire box area. Steel plate 66 is supported on its lower edge portion 67 on fire brick 42, as shown.

The outer edges of steel plates 62 and 66 are sealed to the brickwork 42 by an asbestos mortar 68. Then a glass mat 70 of suitable thickness is secured over asbestos mortar 68 and steel plates 62 and 66 in a suitable workmanship manner, as desired, to retain uniform heating qualities above cooking or barbecue grates 16 and 17. A removable layer of face brick 42 may be laid over mat 70, for a pleasing brick design, if desired.

Chimney 12 communicates with the barbecue grates 16 and 17 and fire box 14, by means of dampers 18 and 20, as desired.

Chimney 12 is comprised of suitable brick and mortar material around a fire liner 72 which is covered at its upper portion with a fire screen 74, and is surrounded by a chimney cap means 76, as shown in FIGURES 1 and 2.

Doors 28 and 32 may be uniquely used for access to top barbecue grates 16, of FIGURES 1 and 4.

Doors 30 and 34 may be uniquely used for access to lower barbecue grates 17 during use of barbecue pit 10.

Referring to FIGURES 1 and 2, door 28 is operably secured by hinge means 29 and hand latch means 29a to frame means 36.

Door 30 is operably secured by hinge means 33 and hand latch means 33a to frame means 36.

Door 32 is operably secured by hinge means 32a and hand latch means 32b to door frame 31.

Referring to FIGURE 2, chimney 12 has a damper 78 and an ash cleanout access plate 80, suitably mounted therein.

Figure 3:
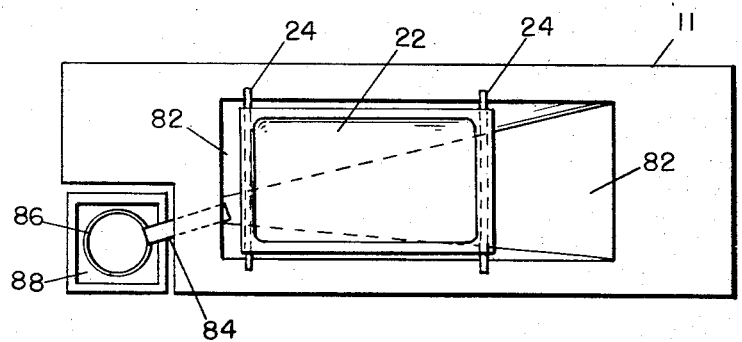
FIGURE 3 is a plan view of FIGURE 2 taken substantially on lines 3—3, looking in the direction of the arrows.

Referring to FIGURES 2 and 3, base 11 comprises a recessed portion 82, of the shape shown which communicates by a conduit 84 with a bucket 86 in bucket pit 88 to care for any excess of grease drippings which may overflow from drip pan 22 mounted on rods 24 suitably mounted on base 11, as shown. Drip pan 22 may be removed for cleaning thereof through an access panel 96, of FIGURE 4, located adjacent to pan 22 located in the lower front walls of barbecue pit 10, or pan 22 may be removed from pit 10 for cleaning by removing top metal plate 62 after removing asbestos seal 68, mat 70 and any brick covering thereover.

Door 34 is operably secured by hinge means 35 and hand latch means 35a to support frame 31.

Fire box door 44 is operably secured to support frame 52 and plate 54 by hinge means 50 and hand latch 46, as best shown in FIGURES 1 and 2.

FIGURE 5 discloses a typical damper as used in barbecue pit 10, which comprises a rod like means 100 having a handle 102. Rod means 100 is mounted in aperture 104 of plate 106 which carries a projecting pin 108 which serves as a stop means for handle 102. Plate 106 is suitably secured by screw or like means in apertures 110 to face brick 42 as shown in FIGURES 1 and 2. Rod 100 suitably carries damper plate 112 secured thereto by set screws 114 or like means, as shown in FIGURE 5. Rod 100 is installed in bearings 116. Bearings 116 comprise radially extending pins 118 which are suitably embedded in brick mortar when installed in barbecue pit or oven 10.

Referring to FIGURE 4, damper plates 112 and 112a each communicate with separate openings 115 and 117 respectively, in chimney 12 and selectively control passage of hot gases from fire box 14 over and under barbecue grates 16 and 17, as desired, during operation of barbecue pit 10. If it is desired that the hot fire gases pass substantially over grate 17, then only the upper damper 112 is opened while the lower damper 112a is closed. If it is desired that hot fire gases pass under the grates, then the upper damper 112 is closed and the lower damper 112a is placed in fully open position. Over openings 115 and 117 of the barbecue pit are mounted angle support means 119, as shown in FIGURE 1.

In the operation of the instant novel barbecue pit, it is customarily fired by selected hickory wood to raise the oven thermometer 26 to a desired temperature, after which the multiple layer of cooking grates therein may be covered with meat to be barbecued for a desired length of time, depending on whether it is desired that the meat be either barbecued rare, medium or well done. Hickory wood is customarily used in the instant barbecue pit, to give the barbecued meat a sweet hickory smoke taste which blends well with other barbecuing seasoning to give the barbecued meat a sweet succulent taste without a burnt grease ingredient in the taste.

Conventional briquettes or like fuels may be used for firing the instant barbecue pit, or a combination of hickory wood and briquettes may be used in the new barbecue pit during firing thereof, if desired, within the purview of this invention.

Doors 28, 30, 32 and 34 may be supportably secured at either edge thereof by hinges and latches, as desired, within the purview of this invention.

From the foregoing it will not be seen that there is herein provided a novel barbecue pit which accomplishes all the objects of this invention during use, and others, including many advantages of great practical utility and commercial importance.

In all cases it is to be understood that the particular arrangements of the invention described herein are presented by way of illustration only, and not by restriction, and that various other arrangements, variations and adaptations may be devised therefor without departing from the true scope of the invention.

What is claimed is:

1. A barbecue oven of the class described, comprising an accessible barbecuing area including a plurality of broiling grates therein and external temperature observing means communicating with said grates, draft means, an end chimney selectively communicating by said draft means with one side of the barbecuing area, an end fire box area having a downwardly sloping roof portion for communicating with the other side of said barbecuing area, said selective chimney draft means communicating with said broiling grates, said draft means comprising a plurality of draft dampers between said chimney and said barbecue area, one of said dampers being above the lowermost grate and another below the lowermost grate to selectively pass the hot gases of the fire box over and under the lowermost grate in said barbecuing area, an external frontal fuel charging door including draft means therein communicating with said fire box area, means for externally removing grease drippings from the barbecuing area, said chimney including ash cleanout means.

2. A barbecue oven of the class described as in claim 1, wherein said broiling grates are arranged as spaced multiple layers.

3. A barbecue oven as in claim 2, wherein a plurality of latchable access doors communicate with each layer of broiling grates in the barbecuing area of said barbecue oven.

4. A barbecue oven as in claim 3, wherein said temperature observing means includes an external oven thermometer centrally communicating with said barbecue area in said barbecue oven.

5. A barbecue oven as in claim 4, wherein said means for removing grease drippings includes a grease drip pan with access panel therefor, and internal base recess means therein communicating by conduit means externally with a grease pit containing a grease receptacle therein.

6. A barbecue oven as in claim 5, wherein said chimney includes abase damper door therein, a base cleanout panel and an external spark arrestor therefor.

7. A barbecue oven as in claim 6, including heat conserving refractory linings for said fire box area, said barbecue area and said chimney.

8. A barbecue oven as in claim 7, including a metal covering above said barbecue area and fire box, said metal covering being externally covered with suitable insulation to effect good heat transfer to said barbecue area.

9. A barbecue pit of the class described for outdoor and indoor use comprising a unitary base having a grease recess therein, masonry walls supported by said base, a metal top having external insulation thereon supported by said walls, an end chimney supported on said base, said pit containing therein an intermediate barbecuing area selectively communicating at one side with internal openings in said chimney, a fire box communicating with the other side of said barbecue area, said barbecue area having internal temperature observing means and spaced multiple layers of barbecue grates therein, access doors mounted in the front of said walls selectively communicating with said grates, a plurality of dampers in said barbecue area between said chimney and said grates communicating with said chimney, one of said dampers being above the lowermost grate and another below the lowermost grate to selectively pass hot gases and smoke from the fire box over and under said lowermost grate, a frontal external fire door communicating with said fire box, and damper means in said fire door.

10. A barbecue pit as in claim 9, wherein said temperature observing means includes an external oven thermometer communicating with said barbecue area.

11. A barbecue pit as in claim 10, wherein said barbecuing pit includes conduit means interconnecting said grease recess in said base with an external grease receptacle.

12. A barbecuing pit as in claim 11, including internal refractory linings for said chimney, said barbecue area and said fire box.

13. A barbecuing pit as in claim 12, wherein said chimney has a base cleanout panel and a top spark arresting screen.

References Cited

UNITED STATES PATENTS

| | | | |
|---|---|---|---|
| 484,113 | 10/1892 | Ruehle et al. | 126—8 |
| 1,595,846 | 8/1926 | Wood | 99—446 |
| 1,896,192 | 2/1933 | Cain | 99—446 |
| 2,314,627 | 3/1943 | Millikan et al. | 126—8 |
| 2,350,948 | 6/1944 | Walker | 126—8 X |
| 2,361,644 | 10/1944 | Mueller. | |
| 2,685,285 | 8/1954 | Bergeron | 126—8 X |
| 3,016,816 | 1/1962 | Persinger et al. | 99—339 |
| 3,041,959 | 7/1962 | Oyler | 99—339 X |
| 3,098,428 | 7/1963 | Maxwell | 126—8 X |

WALTER A. SCHEEL, *Primary Examiner.*

J. M. NEARY, S. P. FISHER, *Assistant Examiners.*